United States Patent
Chang et al.

(10) Patent No.: US 7,266,233 B2
(45) Date of Patent: Sep. 4, 2007

(54) SYSTEM AND METHOD FOR MEASURING AN OBJECT

(75) Inventors: Chih-Kuang Chang, Tu-chen (TW); Li Jiang, Shenzhen (CN)

(73) Assignees: Hong Fu Jin Precision Ind.(Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 771 days.

(21) Appl. No.: 10/653,838

(22) Filed: Sep. 2, 2003

(65) Prior Publication Data
US 2004/0126002 A1 Jul. 1, 2004

(30) Foreign Application Priority Data
Dec. 25, 2002 (TW) ................ 91137238 A

(51) Int. Cl.
*G06K 9/00* (2006.01)
(52) U.S. Cl. ................. 382/141; 382/199; 702/167
(58) Field of Classification Search ........... 382/141, 382/199; 702/167
See application file for complete search history.

(56) References Cited

U.S. PATENT DOCUMENTS

| | | | |
|---|---|---|---|
| 5,015,867 A * | 5/1991 | Siegel et al. ........... 250/559.24 |
| 5,228,066 A * | 7/1993 | DeVane ................. 377/20 |
| 5,907,643 A | 5/1999 | Adachi | |
| 5,912,467 A | 6/1999 | Okino | |
| 6,097,850 A | 8/2000 | Watanabe et al. | |
| 6,141,439 A * | 10/2000 | Yoshida et al. ........... 382/154 |
| 6,801,650 B1 * | 10/2004 | Kikuchi et al. ........... 382/145 |
| 6,975,404 B2 * | 12/2005 | Schwarz ................ 356/446 |
| 6,980,685 B2 * | 12/2005 | Tyan et al. ............. 382/141 |
| 7,001,024 B2 * | 2/2006 | Kitaguchi et al. .......... 353/70 |
| 7,046,839 B1 * | 5/2006 | Richer et al. ............ 382/154 |

FOREIGN PATENT DOCUMENTS

| | | |
|---|---|---|
| CN | 1297303 A | 5/2001 |
| CN | 1349082 A | 5/2002 |
| TW | 140191 | 8/1990 |
| TW | 222026 | 4/1994 |

* cited by examiner

*Primary Examiner*—Sheela Chawan
(74) *Attorney, Agent, or Firm*—Wei Te Chung

(57) ABSTRACT

An image measurement system and method for obtaining measurement data on objects by processing images of the objects is provided. The image measurement system includes an image obtaining device (101) for obtaining a first image of an object to be measured and a second image of a standard object, and a plurality of measurement computers (103) linked to the image obtaining device via a communication network (102). The measurement computers are used for processing the first image and the second image to obtain measurement data on the object. Each of the measurement computers comprises an image obtaining module (210), an image processing module (220), and an image measuring module (230).

8 Claims, 4 Drawing Sheets

SYSTEM AND METHOD FOR MEASURING AN OBJECT

BACKGROUND OF THE INVENTION

1. Field of the Invention

The present invention relates to systems and methods for measuring objects, and particularly to a system and method for obtaining measurement data on objects by processing images thereof.

2. Background of the Invention

Measurement technology has been developing for quite a long time. Humankind has devised various measurement devices to meet new demands for measurement as they arose. The rapid development of science and technology in recent history has driven scientists and engineers to develop even more advanced measurement technology. Inventors and technicians are continuously enhancing measurement devices, and increasingly incorporating manipulation of light, sound and electronics into measurement apparatus. To acquire measurement data on certain objects, complicated measurement apparatus are often needed.

An example of recent measurement technology is disclosed in U.S. Pat. No. 5,228,066, which discloses a system and method for measuring computer system time intervals. The system employs a circuit that can be implemented in a computer system for measuring a maximum and a minimum time interval for system elements to respond to a request for data or information. Another example is found in U.S. Pat. No. 5,015,867, which discloses apparatus and methods for measuring the diameter of a moving elongated material. The apparatus and methods use lasers and charged coupled devices to detect diffraction and interference patterns produced when electromagnetic radiation emitted from at least one laser is partially obscured by edges of the moving elongated material. Thus a variation in a diameter of the material is measured.

There are numerous other measurement apparatus and methods disclosed in the prior art. Even so, few if any of them disclose a system and method for obtaining measurement data on an object efficiently. Obtaining measurement data by processing images of the object is much more effective. However, conventional methods for obtaining images of objects by using purpose-built machines have limited application. At present, many methods are provided for obtaining electronic images of objects. One of the most popular methods is implemented using digital cameras. Nevertheless, the current technology does not provide any system or method for obtaining measurement data on objects by processing images of any format.

SUMMARY OF THE INVENTION

Accordingly, an object of the present invention is to provide a system and method which can obtain measurement data on an object by processing images thereof.

Another object of the present invention is to provide a system and method for obtaining measurement data by processing images obtained via a digital camera.

In order to accomplish the above-mentioned objects, the present invention provides a system for measuring images. The image measurement system comprises an image obtaining device for obtaining a first image of an object to be measured and a second image of a standard object. The first and second images are sent via a communication network to a plurality of measurement computers. Each of the measurement computer comprises an image obtaining module for obtaining the first and second images, an image processing module for processing the first and second images, and an image measuring module for computing an actual size of the object based on the data obtained by the image processing module to obtain measurement data on the object. The image processing module comprises a format conversion sub-module, a proportion conversion sub-module, a border processing sub-module and an image adjusting sub-module. The format conversion sub-module is for converting formats of obtained images into formats which can be identified by a corresponding measurement computer. The proportion conversion sub-module is for computing a conversion proportion based on an actual size and an image size of the standard object. The border processing sub-module is for ascertaining borders of different parts of the measured object according to different lattice densities in the first image, and for ascertaining sizes of different parts based on said borders. The image adjusting sub-module is for adjusting the first image based on different camera lens focuses of the image obtaining device, and for revising size changes of the different parts. Said size changes result from a surface camber of the camera.

A preferred embodiment of a method of the present invention for measuring images comprises the steps of: (i) obtaining a first image of an object to be measured and a second image of an standard object; (ii) converting formats of the first image and second image into formats which can be identified by a measurement computer, and computing a conversion proportion based on an actual size and an image size of the standard object; and (iii) measuring sizes of different parts of the object in the first image, and computing actual sizes of the parts according to the conversion proportion.

Other objects, advantages and novel features of the present invention will be drawn from the following detailed description of preferred embodiments of the present invention with the attached drawings, in which:

DETAILED DESCRIPTION OF PREFERRED EMBODIMENTS OF THE INVENTION

Figure 1:
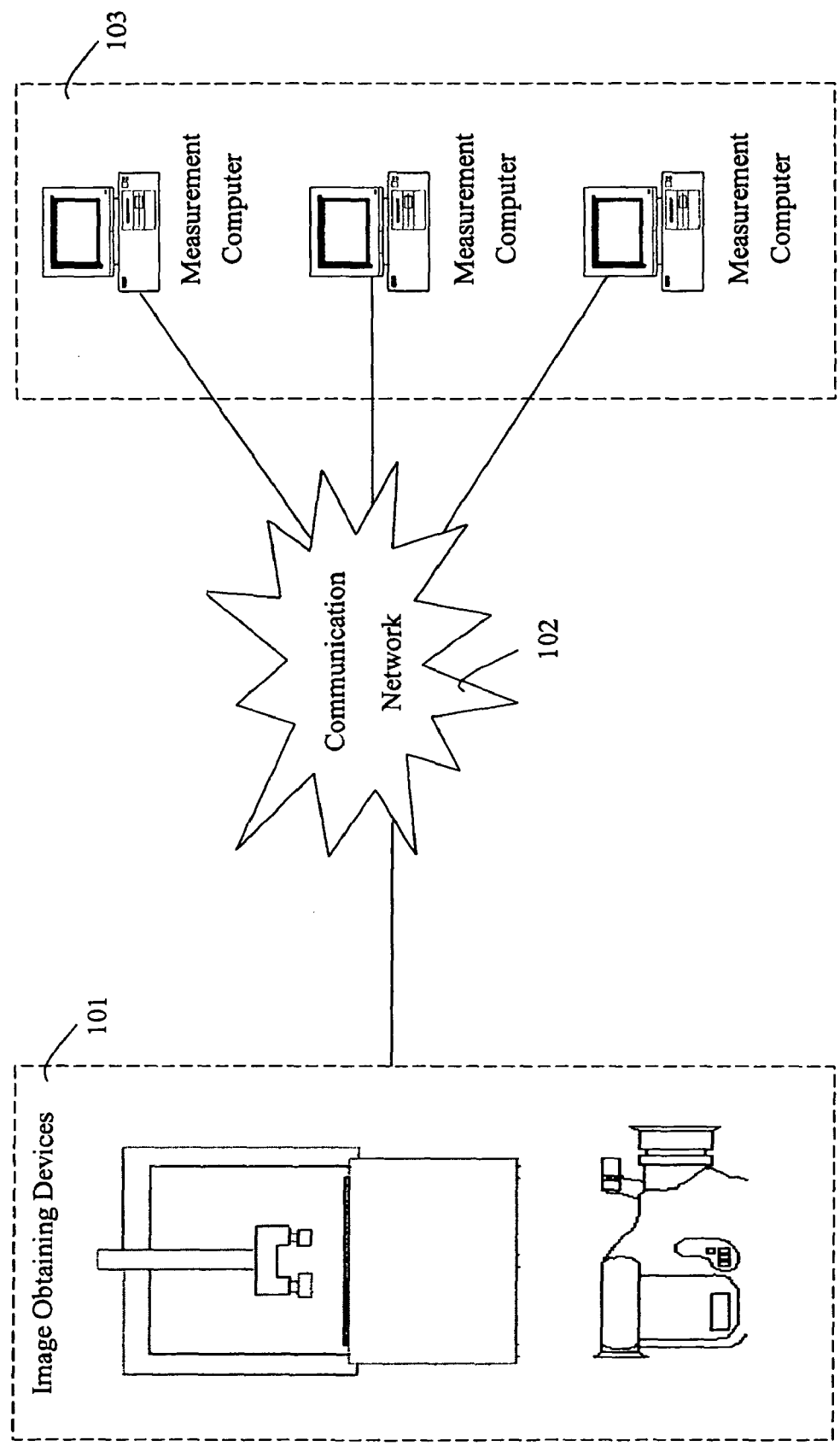
FIG. 1 is a schematic diagram of an application environment of an image measuring system in accordance with a preferred embodiment of the present invention.

FIG. 1 is a schematic diagram of an application environment of an image measuring system in accordance with the preferred embodiment of the present invention. The image measuring system is installed in each of a plurality of measurement computers 103. The measurement computers 103 are linked to various image obtaining devices 101 via a communication network 102. Each image obtaining device 101 may be a special machine or another device, such as a digital camera. An image of an object obtained by any of the image obtaining devices 101 is sent to a corresponding measurement computer 103. The measurement computer 103 processes the image, and generates relevant measurement data on the object. Said measurement data on the object are used, for example, for determining how to improve production procedures for manufacturing the object. The measurement computer 103 may be located at a special measurement workstation or at a production line where the object is a mass-produced.

Figure 2:
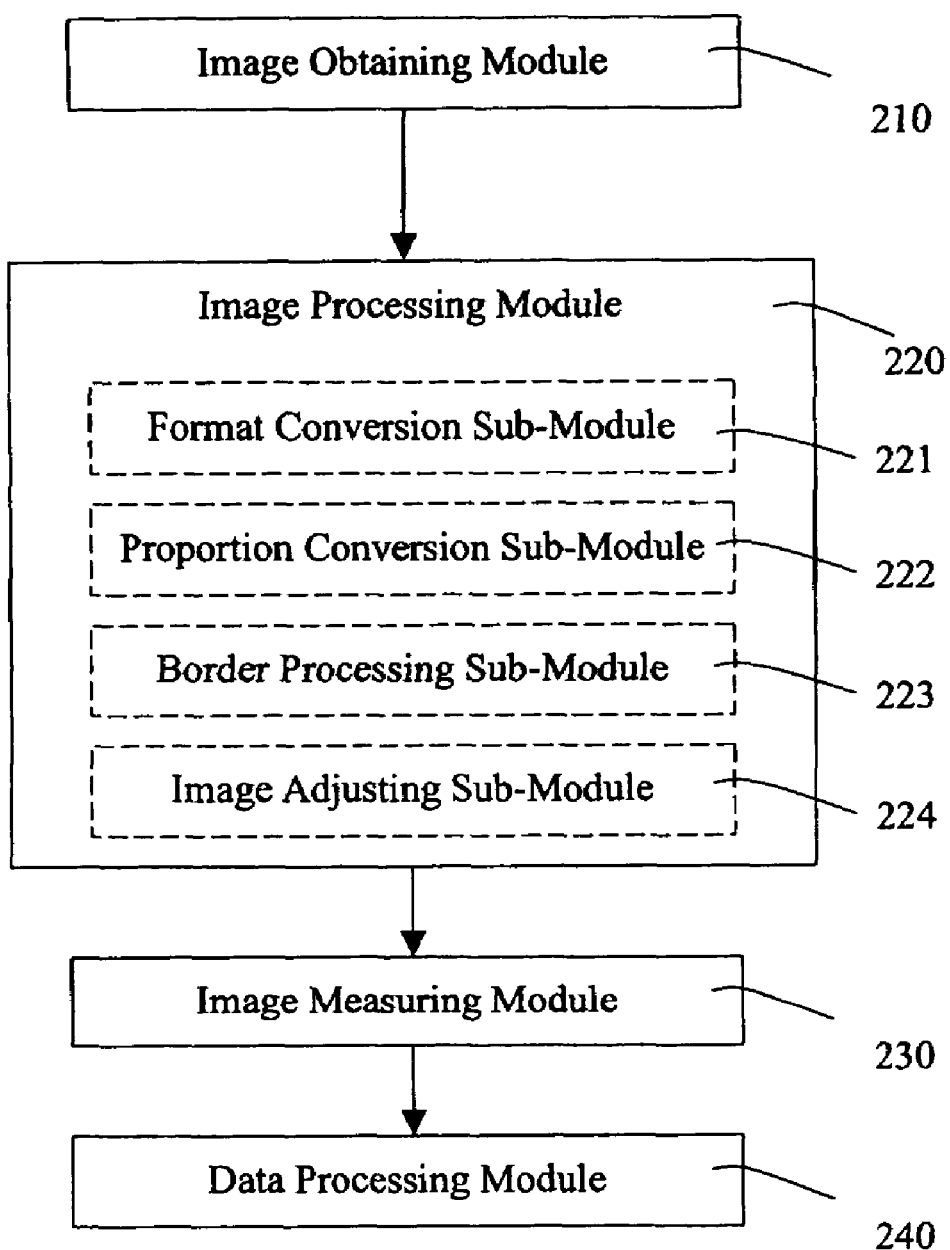
FIG. 2 is a diagram of software infrastructure of the image measuring system of FIG. 1.

FIG. 2 is a block diagram of software infrastructure of the image measuring system. The image measuring system is installed in each of the measurement computers 103, and comprises an image obtaining module 210, an image processing module 220, an image measuring module 230 and a data processing module 240. The image obtaining module 210 is for obtaining a first image of the object to measure and a second image of a standard object having a standard size. These first and second images must be obtained under the same conditions. The second image is obtained to ascertain a conversion proportion which applies in measuring the first and second images. An actual size of an object divided by its image size equals the conversion proportion.

The image processing module 220 is for processing the first and second images obtained by the image obtaining module 210, and comprises a format conversion sub-module 221, a proportion conversion sub-module 222, a border processing sub-module 223 and an image adjusting sub-module 224. The format conversion sub-module 221 is for converting obtained image formats into formats that can be identified by the corresponding measurement computer 103. The proportion conversion sub-module 222 is for computing a conversion proportion based on the actual size of the object and the image size of the standard object. The border processing sub-module 223 is for ascertaining borders of different parts of the object according to different lattice densities in the first image, and for ascertaining sizes of different parts of the object based on said borders. The image adjusting sub-module 224 is for adjusting the first image based on different focuses f of a camera lens of an applicable image obtaining device 101, and for revising size changes of different parts. Said size changes result from a surface curvature of the camera lens.

The image measuring module 230 is for computing and obtaining measurement data on the object based on data obtained by the image processing module 220. In such computing, the borders of a part being measured are ascertained, and the size of the part in the first image is ascertained. Then the actual size of the part is computed, based on the conversion proportion obtained by the proportion conversion sub-module 222. The data processing module 240 is for applying said measurement data on the object to improve production procedures for manufacturing the object.

Figure 3:
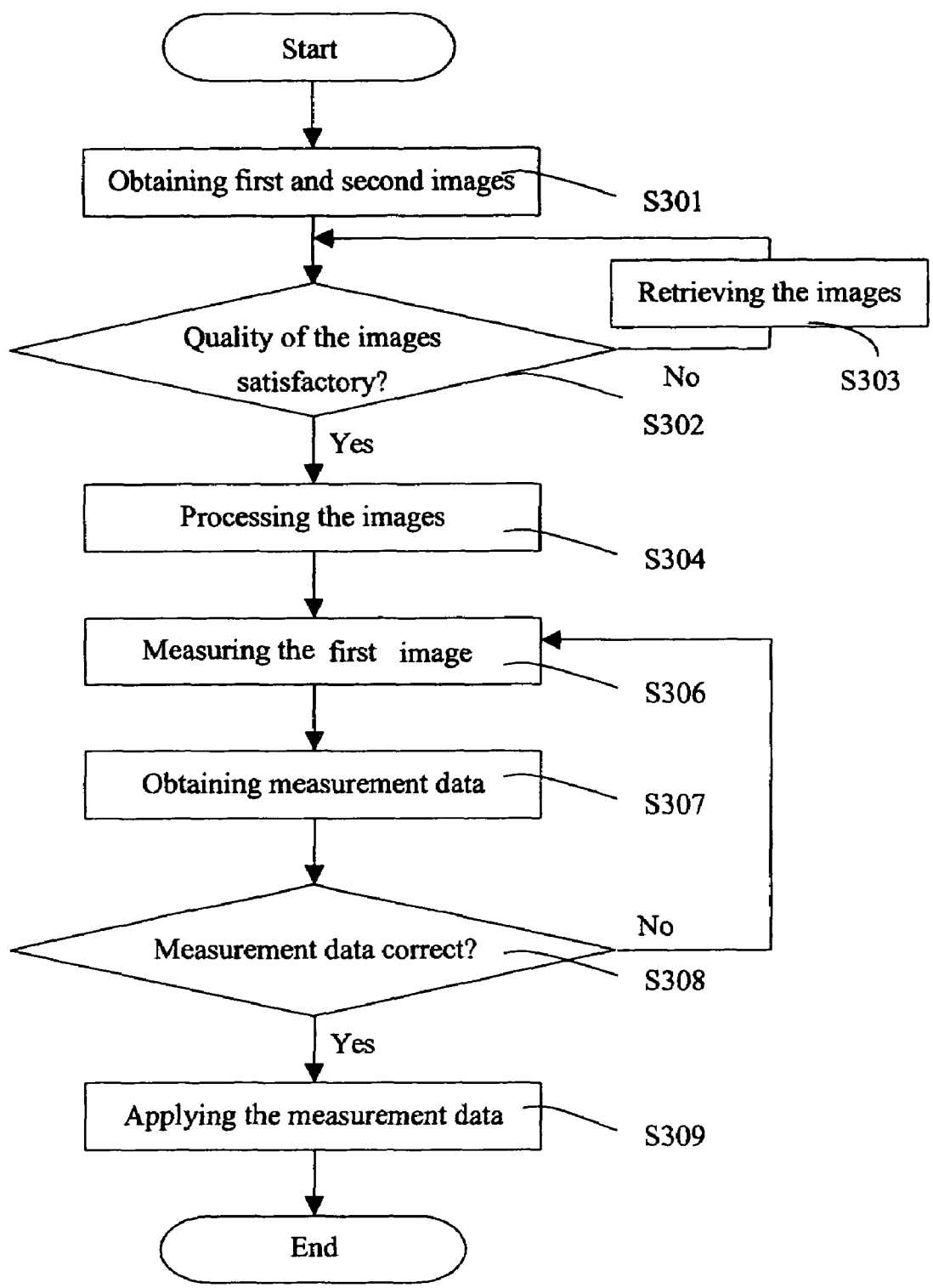
FIG. 3 is a flowchart of operation of the image measuring system of FIG. 1.

FIG. 3 is a flowchart of operation of the image measuring system. In step S301, the image obtaining module 210 obtains from the image obtaining device 101 the first image of the object and the second image of the standard object, the first and second images being obtained under the same conditions. In step S302, inspectors check whether a quality of the first and second images is satisfactory; for example, whether the first and second images are in focus, and whether the angles are suitable. If the quality is not satisfactory, in step S303, the image obtaining module 210 retrieves the images, and the procedure returns to the step S302. If and when the quality is satisfactory, in step S304, the image processing module 220 processes the first and second images. After that, the image measuring system can obtain basic data needed for measuring the object, said basic data comprising a conversion proportion and borders of different parts of the first image. If the image obtaining device 101 is a digital camera, step S304 further comprises the step of the image adjusting sub-module 224 adjusting sizes of different parts of the first image using the focus f of the camera lens. In step S306, the image measuring module 230 computes sizes of the first object. In step S307, based on said basic data, the image measuring module 230 collects the sizes of the first object to generate measurement data on the object. In step S308, relevant operators check whether the measurement data are correct. If the measurement data have error, then the procedure returns to step S306. After obtaining all of the measurement data correctly, in step S309, relevant users apply the obtained measurement data to improve production procedures for manufacturing the object.

Figure 4:
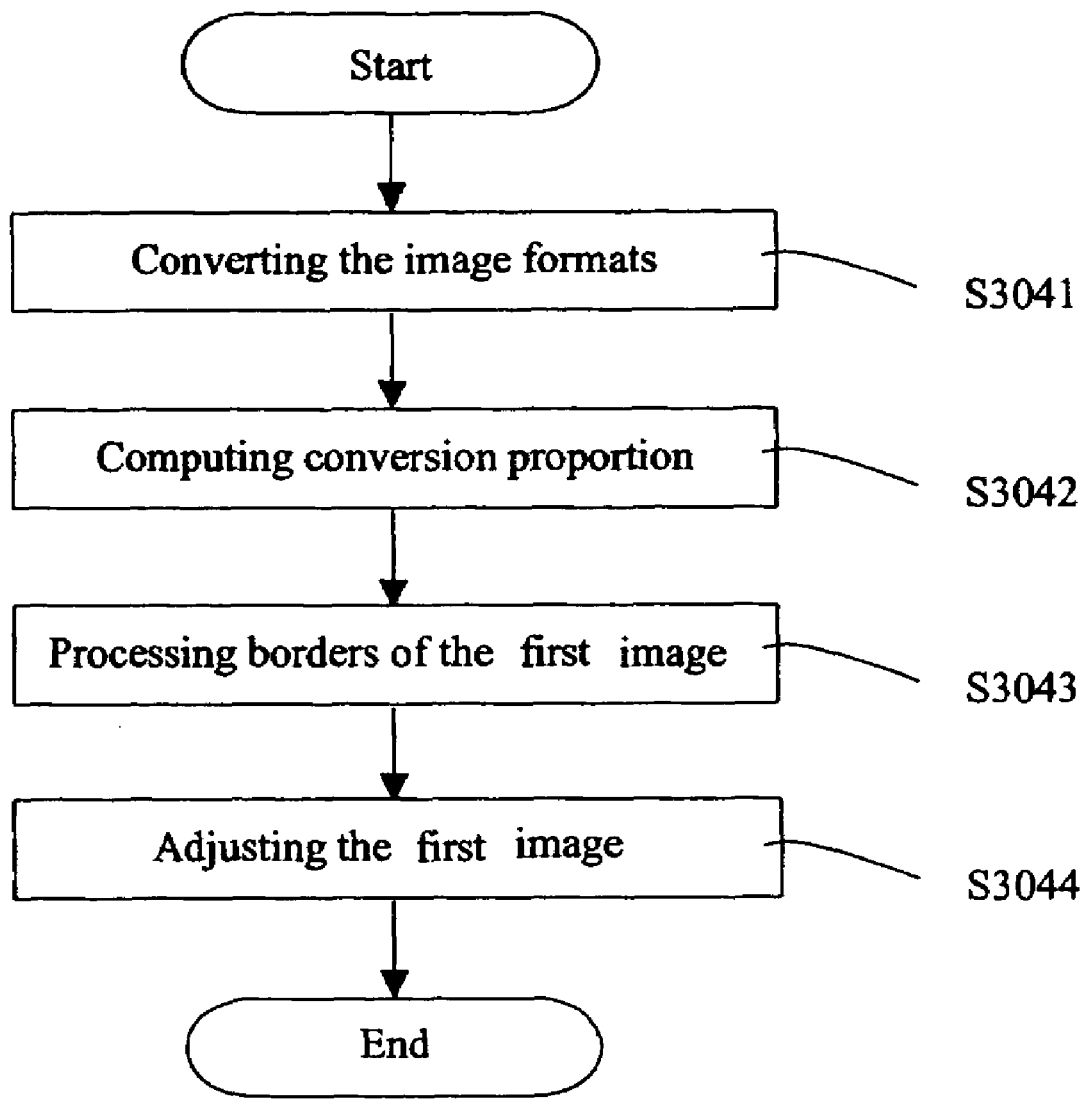
FIG. 4 is a flowchart of details of one step of FIG. 3, namely processing first and second images.

FIG. 4 is a flowchart of details of step S304 of FIG. 3, namely processing the first and second images. In step S3041, the format conversion sub-module 221 converts the obtained image formats into formats that can be identified by the corresponding measurement computer 103. In step S3042, the proportion conversion sub-module 222 computes the conversion proportion based on the actual size of the object being measured and the image size of the standard object. In step S3043, the border processing sub-module 223 ascertains the borders of different parts of the object being measured according to different lattice densities in the first image to ascertain sizes of the parts of the object. In step S3044, the image adjusting sub-module 224 adjusts the first image according to the camera lens focus f of the image obtaining device 101 to revise size changes of the first image. Said size changes result from surface curvature of the camera lens.

While the invention has been described above, it should be understood that it has been presented by way of example only and not by way of limitation. Thus the breadth and scope of the present invention should not be limited by the above-described exemplary embodiment, but should be defined only in accordance with the following claims and their equivalents.

What is claimed is:

1. An image measuring system for obtaining measurement data on an object by processing images thereof, the image measuring system comprising:
    an image obtaining device for obtaining a first image of a measured object and a second image of a standard object; and
    a measurement computer linked to the image obtaining device via a communication network, for processing the first image and the second image to obtain measurement data on the measured object, the measurement computer comprising an image processing module, the image processing module comprising;
    a format conversion sub-module for converting data formats of the first and second images into data formats which can be identified by the measurement computer;
    a proportion conversion sub-module for computing a conversion proportion based on an actual size of the measured object and an image size of the standard object;
    a border processing sub-module for ascertaining borders of different parts of the measured object according to different lattice densities in the first image; and
    an image adjusting sub-module for adjusting the first image according to different camera lens focuses of the image obtaining device.

2. The image measuring system as claimed in claim 1, wherein the image obtaining device is a digital camera.

3. The image measuring system as claimed in claim 1, wherein the first image and the second image are obtained under the same conditions.

4. The image measuring system as claimed in claim 1, wherein the measurement computer further comprises an image obtaining module for obtaining the first image and the second image from the image obtaining device.

5. The image measuring system as claimed in claim 1, wherein the measurement computer further comprises an image measuring module for measuring the first image processed by the image processing module to obtain the measurement data on the measured object.

6. An image measurement method for obtaining measurement data on an object by processing images thereof, the method comprising the steps of:
   (a) obtaining a first image of a measured object and a second image of a standard object from an image obtaining device;
   (b) converting data formats of the first image and the second image into data formats which can be identified by a measurement computer, and computing a conversion proportion based on an actual size of the measured object and an image size of the standard object;
   (c) ascertaining borders of different parts of the measured object according to different lattice densities in the first image;
   (d) adjusting the first image according to a focus of a camera lens of the image obtaining device;
   (e) measuring sizes of different parts of the measured object in the first image, according to the conversion proportion; and
   (f) obtaining measurement data on the measured object that comprises the borders and the sizes of the different parts of the measured object.

7. The image measuring method as claimed in claim 6, wherein the first and second images are obtained by a digital camera.

8. The image measuring method as claimed in claim 6, farther comprising the steps of:
   determining whether the measurement data are correct; and
   repealing step (c) through step (e), if the measurement data are incorrect; or
   applying the measurement data to improve production procedures in manufacturing the measured object, if the measurement data are correct.

* * * * *